United States Patent [19]
Lee et al.

[11] Patent Number: 5,471,504
[45] Date of Patent: Nov. 28, 1995

[54] BILINEAR DECISION FEEDBACK EQUALIZER

[75] Inventors: Junghsi Lee, Taipei; Ginkou Ma, Hsinchu, both of Taiwan

[73] Assignee: Computer & Communication Research Laboratories, Hsinchu, Taiwan

[21] Appl. No.: 227,535

[22] Filed: Apr. 14, 1994

[51] Int. Cl.$^6$ ................................................. H03H 7/30
[52] U.S. Cl. .......................... 375/233; 375/229; 375/230; 375/232
[58] Field of Search ................................ 375/11, 12, 13, 375/14, 233; 364/724.19, 724.2

[56] References Cited

U.S. PATENT DOCUMENTS 5,327,459  7/1994  Hara et al. ................................. 375/12

OTHER PUBLICATIONS

Shahid Qureshi "Adaptive Equalization" IEEE Communications Magazine, pp. 9–16, Mar. 1982.

Zoran Fejzo et al. "Cancellation of ISI in Non–linear Voice–Band Data Channels", IEEE ICASSP 93, pp. III–388–III–391, Apr. 1993.

Pedro M. Crespo et al., "Pole–Zero Decision Feedback Equalization with a Rapidly Converging Adaptive IIR Alogorithm", IEEE Journal on Selected Areas in Communications vol. 9, No. 6, pp. 817–829, Aug. 1991.

Junghsi Lee et al., "A Fast Recursive Least Squares Adaptive Second Order Volterra Filter and Its Performance Analyses" IEEE Transactions on Signal Processing vol. 41, No. 3, Mar. 1993, pp. 1087–1102.

Junghsi Lee "Adaptive Polynomial Filtering Algorith", Thesis, Department of Electrical Engineering, University of Utah, 1992.

*Primary Examiner*—Stephen Chin
*Assistant Examiner*—Huong Luu
*Attorney, Agent, or Firm*—Meltzer, Lippe, Goldstein et al.

[57] ABSTRACT

The present invention comprises an adaptive bilinear decision feedback equalizer to be implemented in a receiver to cancel the intersymbol interference. Basically, the decision feedback equalizer has a feed-forward filter, a feedback filter and a bilinear filter. The equalizer coefficients are determined recursively using an RLS or LMS algorithm.

8 Claims, 4 Drawing Sheets

BILINEAR DECISION FEEDBACK EQUALIZER

FIELD OF THE INVENTION

The present invention relates to an adaptive equalizer used in communication systems. More particularly, the present invention relates to an adaptive decision feedback equalizer employing a bilinear system.

BACKGROUND OF THE INVENTION

The rapidly rising need for higher speed data transmissions to furnish computer communications has been met primarily by utilizing the widespread network of voice-band channels developed for voice communications. A modulator-demodulator (MODEM) is required to carry digital signals over these analog passband channels by translating digital data to analog signals and back.

Real analog channels reproduce at their output a transformed and corrupted version of the input waveform. Statistical corruption of the waveform may be additive and/or multiplicative, because of possible background thermal noise, impulse noise and fades. Examples of determinative (although not necessarily known) transformations performed by the channel are frequency translation, nonlinear or harmonic distortion and time dispersion. In telephone lines, time dispersion results from the deviation of the channel frequency response from the ideal characteristics of constant amplitude and linear phase (or constant delay).

A typical data transmission system is schematically illustrated in FIG. 1. The data transmission system 10 of FIG. 1 comprises a transmitter 12. The transmitter 12 comprises an encoder 121 and a transmit filter 122. The encoder 121 receives at an input 123 a bit stream and encodes the bits into symbols. While a bit can only take on the values "0" or "1", a symbol can assume values from a predetermined alphabet. These symbols are designated x(k), where k is a discrete time variable and takes on the values k=0,1,2,3, . . . The simplest encoder converts the bits into symbols with the same values, i.e., the predetermined alphabet is {0,1}. A more complicated encoder may translate pairs of bits from the set {00, 01, 10, 11} into one of four values from the predetermined alphabet {−3, −1, +1, +3}. These symbols are applied to a transmit filter 122, which produce a continuous-time signal, r(t), for transmission over the continuous-time channel 14.

The signal at the output of the channel 14 is designated r'(t). The output r'(t) of the channel 14 is connected to a receiver 16. The receiver 16 comprises a receive filter 18, a sampler 24, an equalizer 20, a decoder 22 and a timing recovery 23. The receive filter 18 produces a signal s(t) from r'(t). The signal s(t) is applied to the sampler 24. The signal at the output of the sampler 24 is designated z(k). The output z(k) of sampler 24 is distorted version of x(k). That is, the symbols x(k) are distorted in the channel 14 both statistically and deterministically (as described above) by the channel 14 resulting in the distorted symbols z(k).

In many data communication systems, the effect of each symbol transmitted over a time dispersive channel extends beyond the time interval used to represent that symbol. The distortion caused by the resulting overlap of the transmitted symbols is called intersymbol interference (ISI). The ISI associated with x(k) comprises two parts: One part is caused by the effect of symbols with negative delays, i.e., x(k+1), where 1 is greater than zero. This is pre-cursor ISI. A second part is due to the symbols with positive delays, i.e., x(k−1), where 1 is greater than zero. Accordingly, this is post-cursor ISI. ISI is one of the major obstacles to reliable high-speed data transmission over a low background noise channel of limited bandwidth. Thus, the symbols z(k) are distorted by ISI as well as other distortions.

The channel equalizer 20 is provided to correct for the distortions introduced by the channel 14. Thus, the channel equalizer 20 receives the distorted symbols z(k) and outputs the symbols $\hat{x}(k)$ which approximate as closely as possible the original symbols x(k). The symbols $\hat{x}(k)$ are then decoded by the decoder 22 to recover the original bit stream.

If the channel characteristics are known, the distortion of the channel can be eliminated. However, the channel characteristics are generally unknown. They vary with time in response to a variety of different conditions such as atmospheric disturbances. Accordingly, an adaptive equalizer is utilized to compensate the time-varying telecommunications channel.

A variety of approaches to adaptive equalization are disclosed in the prior art (See e.g. Qureshi "Adaptive Equalization" IEEE Communications Magazine, pp 9–16, March 1982; Fejzo et al., "Cancellation of ISI in Non-linear Voice-Band Data Channels", IEEE ICASSP 93, pp.III 388–391, April 1993; Crespo et al., "Pole-Zero Decision Feedback Equalization With a Rapidly Converging Adaptive IIR Algorithm", IEEE Journal on Selected Areas in Communications Vol. 9, No. 6, pp 817–829, August 1991).

An example of a prior art equalizer 20 is illustrated in FIG. 2. The equalizer 20 comprises a linear transversal filter 30 and a decision device 40.

The input 31 to the linear transversal filter 30 is the distorted symbols z(k). The linear transversal filter outputs the sum $$\tilde{x}_1(k) = \sum_{i=-n}^{m} a_i(k-1)z(k-i)$$

for each value of k. The sum $\tilde{x}_1(k)$ is then inputted to the decision device 40. The decision device 40 generates a symbol $\hat{x}(k)$ from each $\tilde{x}_1(k)$ by deciding which symbol in the predetermined alphabet set (e.g., −3,−1,+1,+3) the sum $\tilde{x}_1(k)$ represents.

Illustratively, the linear transversal filter 30 comprises a tapped delay line 35. For each cycle (i.e. for each increment in the value of k) the z(k−i)'s are shifted one position to the right in the tapped delay line 35. For each cycle, each z(k−i) value in the tapped delay line 35 is multiplied by a coefficient $a_i(k)$ using a multiplier 32. The products are then summed by the summer 33 to obtain a value $\tilde{x}_1(k)$.

The coefficients $a_i(k)$ are determined adaptively using, for example, a Least Mean Square (LMS) algorithm. Other approaches like Recursive Least Squares (RLS) may be taken to adaptively determine the filter coefficients. Before regular data transmission begins, automatic synthesis of the coefficients $a_i(k)$ for an unknown channel, which involves an iterative solution of the LMS or RLS methods, takes place during a training period. The automatic synthesis of the coefficients is made possible by sending a known signal via the channel 14 to learn its characteristics.

The linear adaptive equalizer described above in connection with FIG. 2 suffers from a number of shortcomings. Specifically, such an equalizer may require a very large number of taps (i.e. coefficients) in order to eliminate the linear channel distortions and may not be effective at all in eliminating non-linear channel distortions. Thus, the linear adaptive equalizer is not entirely effective in eliminating ISI especially non-linear ISI caused by non-linear channel distortions.

One prior art, a fairly simple non-linear adaptive equalizer, which can eliminate some non-linear channel distortions is the Decision Feedback Equalizer. A Decision Feedback Equalizer is schematically illustrated in FIG. 3. The Decision Feedback Equalizer 20' of FIG. 3 includes a feed-forward section 51 and a feedback section 52. The feed-forward section 51 comprises a linear transversal filter 30 (discussed above in connection with FIG. 2) with an input-output relationship $$\tilde{x}_1(k) = \sum_{i=-r}^{0} a_i(k-1)z(k-i)$$

The feedback section 52 comprises a second linear transversal filter 60 with the following input-output relationship $$\tilde{x}_2(k) = \sum_{i=1}^{s} b_i(k-1)\hat{x}(k-i)$$

The summer 70 sums $\tilde{x}_1(k)$ from filter 30 and $\tilde{x}_2(k)$ from filter 60 to obtain $\tilde{x}(k)=\tilde{x}_1(k)+\tilde{x}_2(k)$. $\tilde{x}(k)$ is then inputted to the decision device to obtain a corresponding $\hat{x}(k)$.

The coefficients $a_i(k)$ and $b_i(k)$ are obtained adaptively using, for example, an LMS or RLS algorithm.

The general idea behind the Decision Feedback Equalizer can be described as follows. The ISI associated with symbol x(k) was contributed by post-cursor symbols as well as pre-cursor symbols. The Decision Feedback Equalizer manipulates the already detected symbols (assumed to be correct) together with the newly arriving symbols to obtain $\tilde{x}(k)$. Precisely, $\tilde{x}(k)$ is a weighted linear combination of $\hat{x}(k-i)$'s and $z(k-i)$'s. This manipulation is a linear operation of symbols. Thus, this Decision Feedback Equalizer cannot eliminate all nonlinear distortions.

A more sophisticated filter which may be used to model a nonlinear channel is the Volterra Filter (See e.g. Lee et al "A Fast Recursive Least Squares Adaptive Second Order Volterra Filter and Its Performance Analyses" IEEE Transactions on Signal Processing Vol. 41, No. 3, March 1993, pp 1087–1102). However, when a Volterra Filter is incorporated in a channel equalizer, it requires a great number of coefficients to properly represent a nonlinear channel. Determining these coefficients can be a very complex task, even when fast algorithms are employed.

A promising approach to eliminating the problems with Volterra Filters is to use nonlinear filters with feedback. An example of nonlinear filter with feedback is the bilinear filter (see e.g. Lee "Adaptive Polynomial Filtering Algorithm", Thesis, Department of Electrical Engineering, University of Utah, 1992).

It is an object of the present invention to provide a channel equalizer which utilizes a bilinear filter.

SUMMARY OF THE INVENTION

The present invention is a channel equalizer comprising a bilinear filter which receives distorted symbols z(k). The output symbols of the filter are $\tilde{x}(k)$. The output symbols of the filter $\tilde{x}(k)$ are fed to a decision device which outputs $\hat{x}(k)$.

The input-output relationship of the bilinear filter is $$\tilde{x}(k) = \sum_{i=-r}^{0} a_i(k-1)z(k-i) + \sum_{i=1}^{s} b_i(k-1)\hat{x}(k-i) + \sum_{i=-r}^{0}\sum_{j=1}^{s} c_{i,j}(k-1)z(k-i)\hat{x}(k-j) \quad (1)$$

where r>0, s>0.

The first two terms in $\tilde{x}(k)$ correspond to the feed-forward and feedback stages of the commonly used Decision Feedback Equalizer 20' of FIG. 3. The third term is the bilinear term which is added according to the invention.

The coefficients $a_i(k)$, $b_i(k)$, $c_{i,j}(k)$ are determined as follows:

Define an input vector Q(k)

$$Q(k) = [z(k+r), z(k+r-1), \ldots, z(k), \hat{x}(k-1), \hat{x}(k-2), \ldots, \quad (1)$$
$$\hat{x}(k-s), z(k+r)\hat{x}(k-1), z(k+r)\hat{x}(k-2), \ldots,$$
$$z(k)\hat{x}(k-s)]^T$$

Define a coefficient vector W(k)

$$W(k)=[a_{-r}(k), a_{-r+1}(k), \ldots, a_0(k), b_1(k), b_2(k), \ldots, b_s(k), c_{-r,1}(k), c_{-r,2}(k), c_{0,s}(k)]^T \quad (3)$$

Then define $$\alpha(k) = \hat{x}(k) - \tilde{x}(k) \quad (4)$$

$$G(k) = \frac{\lambda^{-1}\Omega(k-1)Q(k)}{1+\lambda^{-1}Q^T(k)\Omega(k-1)Q(k)} \quad (5)$$

where $\lambda$ is the forgetting factor (a predetermined constant) that controls the rate at which the equalizer equalizes a channel whose characteristics are time varying. (Illustratively, $\lambda$ has a value 0.9985).

The time dependence of W(k) is given by $$W(k)=W(k-1)+G(k)\alpha(k) \quad (6)$$

The time dependence of $\Omega(k)$ is given by $$\Omega(k)=\lambda^{-1}\Omega(k-1)-\lambda^{-1}G(k)Q^T(k)\Omega(k-1) \quad (7)$$

It should be noted that Q(k), W(k) and G(k) are column vectors with rs+2s+r+1 elements, and $\Omega(k)$ is a (rs+2s+r+1)×(rs+2s+r+1) square matrix.

DETAILED DESCRIPTION OF THE INVENTION

Figure 1:
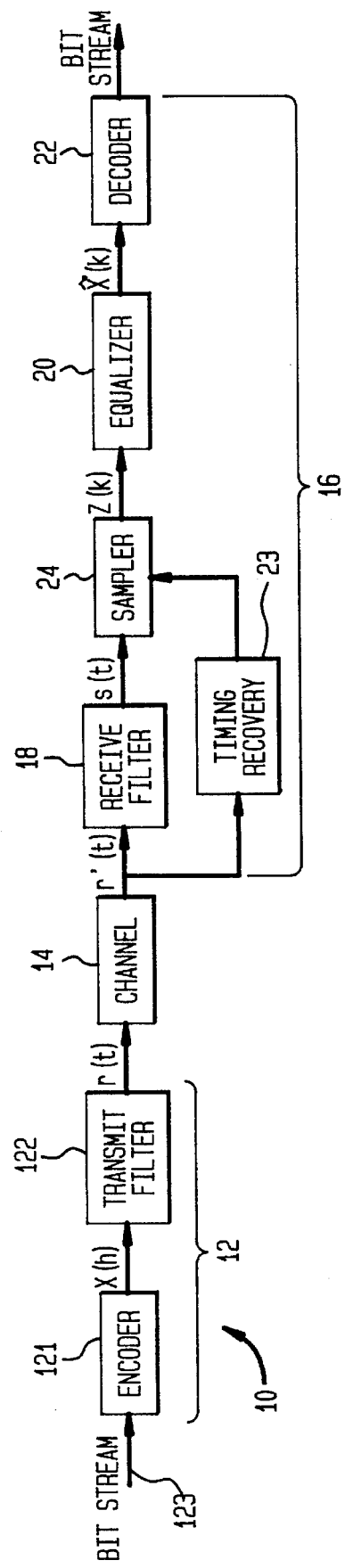
FIG. 1 illustrates a communications channel.
Figure 2:
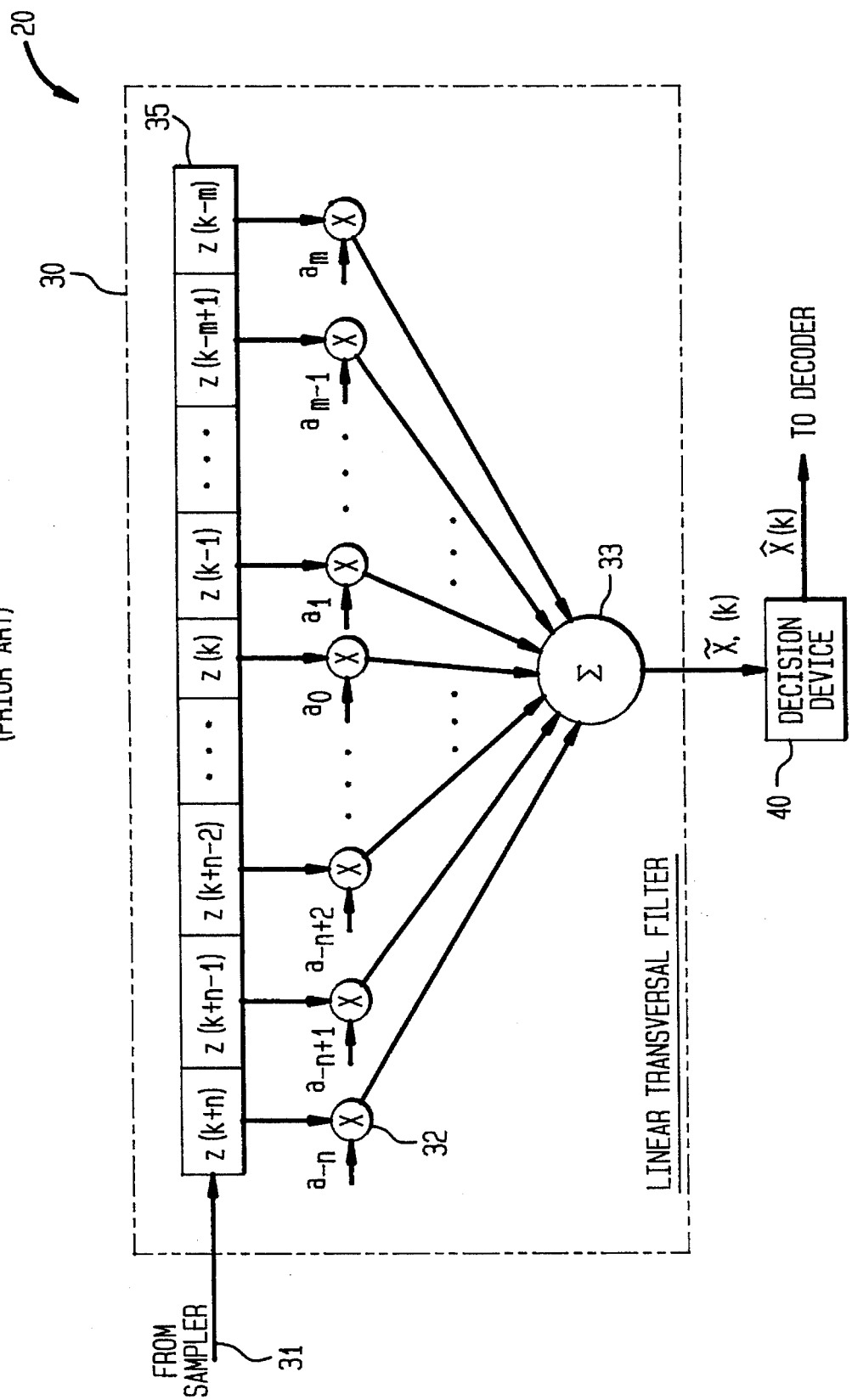
FIG. 2 illustrates a prior art adaptive linear channel equalizer.
Figure 3:
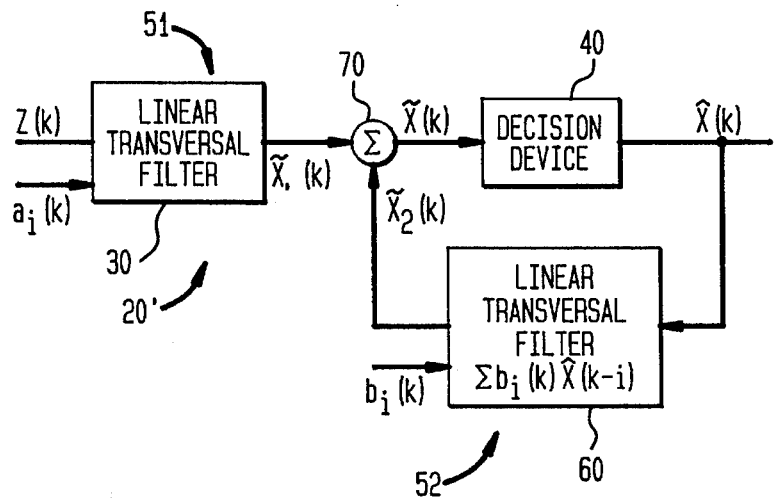
FIG. 3 illustrates a prior art Decision Feedback Equalizer.
Figure 4:
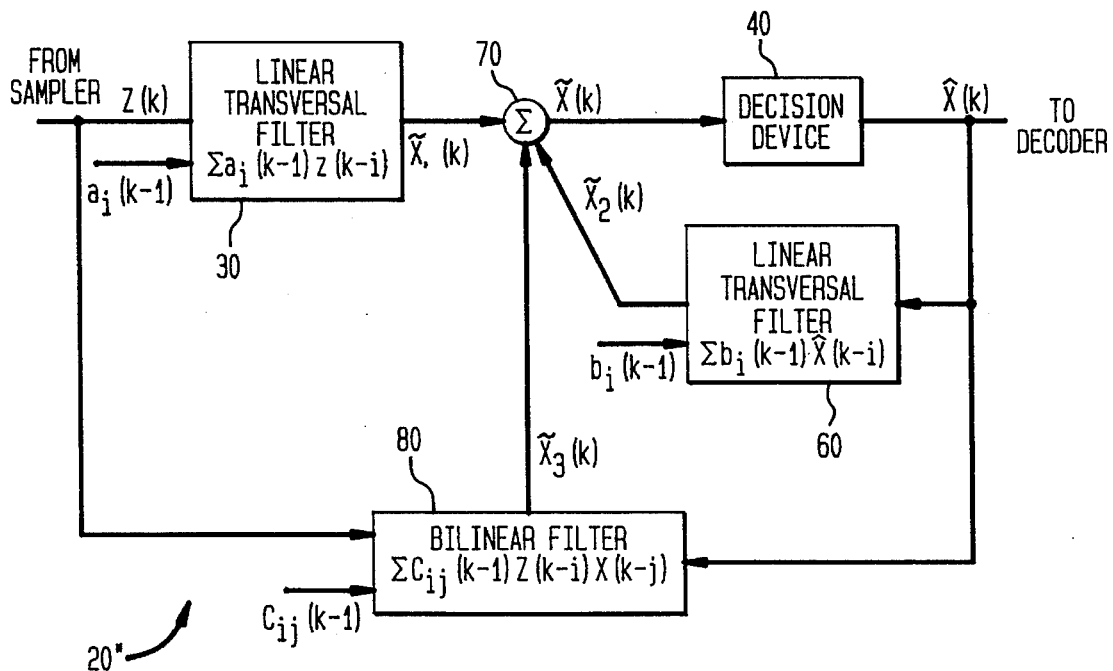
FIG. 4 illustrates an adaptive bilinear channel equalizer in accordance with the present invention.

FIG. 4 illustrates an equalizer in accordance with the present invention. The equalizer 20" of FIG. 4 contains all of the elements of the Decision Feedback Equalizer 20' of FIG. 3 including the feed-forward linear transversal filter 30, the feedback linear transversal filter 60, the summer 70, and the decision device 40. The equalizer 20" also includes the bilinear filter 80 with the following input-output relationship $$\tilde{x}_3(k) = \sum_{i=-r}^{0} \sum_{j=1}^{s} c_{i,j}(k-1)z(k-i)\hat{x}(k-j)$$

Thus, in the equalizer 20" of the FIG. 4, the sum $\tilde{x}(k)$ is now the sum of $\tilde{x}_1(k)$ produced by the linear transversal filter 30, $\tilde{x}_2(k)$ produced by the linear transversal filter 60, and $\tilde{x}_3(k)$ produced by the bilinear filter 80.

Figure 5:
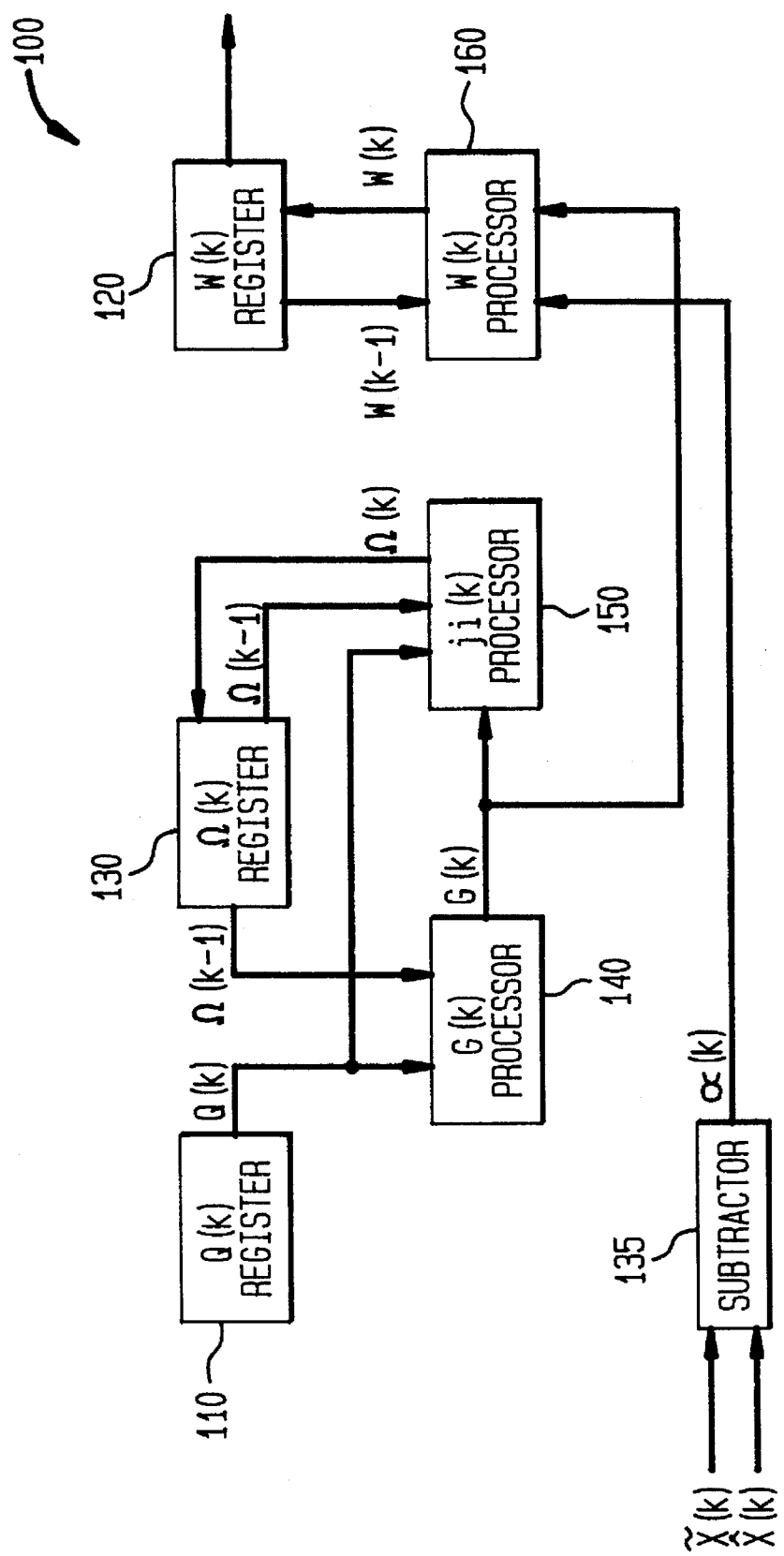
FIG. 5 illustrates an arrangement for adaptively determining coefficients for use in the equalizer of FIG. 4 according to the Recursive Least Squares algorithm.

The coefficients $a_i(k)$, $b_i(k)$, $c_{i,j}(k)$ may be determined using the RLS algorithm by the arrangement shown in FIG. 5 and inputted into the filters 30, 60 and 80.

The arrangement 100 of FIG. 5 comprises three registers. A first register 110 stores the input vector Q(k) as defined in Equation (2). A second register 120 stores the coefficient vector W(k) as defined in equation (3). A third register 130 stores the square matrix $\Omega(k)$.

The arrangement 100 also comprises a subtractor 135, for determining $\alpha(k)$ according to Equation (4), a processor 140 for determining G(k) according to Equation (5), a processor 150 for determining $\Omega(k)$ according to Equation (7) and a processor 160 for determining W(k) according to Equation (6).

To determine the coefficients W(k), the subtractor 135 determines $\alpha(k)$ from $\tilde{x}(k)$ and $\hat{x}(k)$. The processor 140 then receives Q(k) as an input from register 110, and $\Omega(k-1)$ as an input from the register 130. The processor 140 then outputs G(k) according to Equation (5). The processor 150 receives G(k) as an input, $\Omega(k-1)$ as an input from register 130 and Q(k) as an input from register 110. The processor 150 outputs an updated matrix $\Omega(k)$ in accordance with equation (7) and this is stored in the register 130. The processor 160 receives $\alpha(k)$ from the subtractor 135, G(k) from the processor 140 and W(k-1) from the register 120. The processor 160 outputs an updated coefficient vector W(k) in accordance with Equation (6) and this is stored in the register 120.

The coefficients W(k) can then be used as multiplication weights in the filters 30, 60 and 80 of FIG. 4.

In an alternative to the arrangement 100 of FIG. 5, the coefficients $a_i(k)$, $b_i(k)$, $c_{i,j}(k)$ can be calculated using a microprocessor operating under the control of a stored program or using a digital signal processor (DSP).

It should be noted that the coefficients are first determined during a training period when known symbols are transmitted via the channel. It may be desirable to periodically retrain the equalizer during operation.

In short, an adaptive bilinear channel equalizer has been disclosed. The adaptive bilinear equalizer is an improvement over prior art channel equalizers in terms of its complexity (i.e. number of coefficients), and its ability to properly equalize a nonlinear channel with a minimum amount of required coefficients.

Finally, the above described embodiments of the invention are intended to be illustrative only. Numerous alternative embodiments may be devised by those skilled in the art without departing from the spirit and scope of the following claims.

We claim:

1. A channel equalizer, comprising:

a first linear filter connected to receive an equalizer input signal and to output a first filtered signal;

a decision device connected to receive a combined filtered signal from a summer and to output an equalized output signal, said equalized output signal being an output of said equalizer;

a second linear filter connected to receive said equalized output signal and to output a second filtered signal;

a bilinear filter connected to receive said equalized output signal and said equalizer input signal, and to output a third filtered signal; and the summer connected to receive said first, second, and third filtered signals, and to output said combined filtered signal.

2. The equalizer of claim 1 wherein said first linear filter, said second linear filter, said bilinear filter, and said summer are described by:

$$\tilde{x}(k) = \sum_{i=-r}^{0} a_i(k-1)z(k-i) + \sum_{i=1}^{s} b_i(k-1)\hat{x}(k-i) +$$

$$\sum_{i=-r}^{0} \sum_{j=1}^{s} c_{i,j}(k-1)z(k-i)\hat{x}(k-j)$$

where k is a discrete time variable;

Z(k) is said equalizer input signal, wherein said equalizer input signal is a distorted signal;

$\hat{x}(k)$ is said equalized output signal of said equalizer outputted by said decision device;

$\tilde{x}(k)$ is said combined filtered signal outputted from said summer; and $a_i(k)$, $b_i(k)$, $c_{ij}(k)$ are adaptively determined coefficients.

3. The equalizer of claim 2 wherein said coefficients are determined adaptively using a Recursive Least Squares algorithm.

4. The equalizer of claim 1 further comprising a coefficient determining circuit having inputs connected to said decision device and said summer and having outputs connected to said first and second linear filters and to said bilinear filter, wherein said coefficient determining circuit is connected to receive said combined filtered signal and said equalized output signal and to output a first set of coefficients to said first linear filter, a second set of coefficients to said second linear filter and a third set of coefficients to said bilinear filter.

5. A receiver for use in a communication system comprising:

a receive filter connected to receive a signal transmitted over a communications channel to generate distorted symbols; and an equalizer connected to equalize said distorted symbols, said equalizer comprising:

a first linear filter connected to receive an equalizer input signal and to output first filtered symbols;

a decision device connected to receive combined filtered symbols and configured to associate each one of said filtered symbols with one symbol in a predetermined set of symbols to generate output symbols;

a second linear filter connected to receive said output symbols and to output second filtered symbols;

a bilinear filter connected to said decision device and to said receive filter, wherein said bilinear filter receives said output symbols and said distorted symbols, and outputs third filtered symbols;

a summer connected to receive said first, second, and third filtered symbols, and to output said combined filtered symbols to be received by said decision device; and a decoder in communication with the decision device configured to receive equalized symbols and configured to decode the equalized symbols to generate a bit stream.

6. The receiver of claim 5 further comprising a coefficient determining circuit connected to said decision device and to said summer, said coefficient determining circuit connected to receive said combined filtered symbols inputted into said decision device and said output symbols outputted from said decision device, and to output coefficients to said first linear filter, said second linear filter, and said bilinear filter.

7. A channel equalizer, comprising:

an input connected to receive symbols distorted as a result of transmission through a communications channel;

a filter connected to said input, wherein said filter receives said distorted symbols and outputs combined filtered symbols; and a decision device connected to receive said combined filtered symbols and configured to associate each combined filtered symbol with one symbol in a predetermined set of symbols to generate output symbols;

said filter comprising:

a first linear filter connected to said input, said first linear filter configured to receive said distorted symbols and to output first filtered symbols;

a second linear filter connected to said decision device, wherein said second linear filter is configured to receive said output symbols and to output second filtered symbols;

a bilinear filter connected to said decision device and to said input, wherein said bilinear filter is configured to receive said output symbols and said distorted symbols, and to output third filtered symbols; and a summer connected to said first and second linear filters, to said bilinear filter and to an input of said decision device, wherein said summer sums said first, second, and third filtered symbols and outputs said combined filtered symbols.

8. The channel equalizer of claim 7 wherein said filter further comprises a coefficient determining circuit having inputs connected to said decision device and said summer and having outputs connected to said first and second linear filters and to said bilinear filter, wherein said coefficient determining circuit receives said filtered symbols and said output symbols and outputs a first set of coefficients to said first linear filter, a second set of coefficients to said second linear filter and a third set of coefficients to said bilinear filter.

* * * * *